United States Patent [19]

Hamm, Jr.

[11] 4,266,179

[45] May 5, 1981

[54] SOLAR ENERGY CONCENTRATION SYSTEM

[76] Inventor: James E. Hamm, Jr., 11824 Kim Pl., Potomac, Md. 20854

[21] Appl. No.: 15,858

[22] Filed: Feb. 27, 1979

[51] Int. Cl.³ .......................... F24J 3/02; H01J 45/00
[52] U.S. Cl. .................................. 322/2 R; 126/424; 353/3
[58] Field of Search ...................... 322/2 R; 310/306; 353/3; 250/203 R; 126/424, 425; 136/89 PC; 350/289, 292–294

[56] References Cited

U.S. PATENT DOCUMENTS

| | | | |
|---|---|---|---|
| 1,642,545 | 9/1927 | Harvey | 353/3 |
| 2,646,720 | 7/1953 | Poliansky | 353/3 |
| 2,751,816 | 6/1956 | Strong | 350/292 |
| 3,118,437 | 1/1964 | Hunt | 350/292 X |
| 3,264,512 | 8/1966 | Beggs | 310/306 X |
| 3,467,840 | 9/1969 | Weiner | 310/306 |
| 3,523,721 | 8/1970 | Hofmann | 350/292 X |
| 3,656,844 | 4/1972 | Botskor | 353/3 |
| 4,086,485 | 4/1978 | Kaplow et al. | 250/203 R |
| 4,122,827 | 10/1978 | Rhodes | 126/424 X |

*Primary Examiner*—Robert J. Hickey
*Attorney, Agent, or Firm*—Warren H. Kintzinger

[57] ABSTRACT

A solar radiant energy concentrating system for concentrating solar radiation on a radiant to electric power thermionic conversion transducer. The radiated energy concentration system utilizes multiple reflector units that collectively together or selectively less than all reflectors as an intensity control are settable to reflect solar radiation onto a multi-surfaced concentrator down onto a focal area encompassing the target area for reflection from the concentrator to the transducer input. The energy concentration is varied in the ratio range of from 20,000 to 1 up to 250,000 to 1. Reflector units are set to compensate for the constantly varying declination angle of the earth toward the sun, step tracks the sun compensating for daily rotation of the earth West to East on its axis up to a full 360° depending on latitude North or South of the equator. The concentrator is generally circular in shape, made up of a series of circular bands with the concentrator stationary and situated such that one or more of the reflector devices can be appropriately aligned at all times to reflect the desired greatest amount of solar energy onto the concentrator. The circular bands are concaved inward and each set at an angle in reference to a flat-face surface to reflect and concentrate the solar rays' input between the inner and outer edges of a circular band to a prescribed facal area. The transducer is also mounted in stationary relation to the concentrator such as to avoid flexing of electrical power leads.

18 Claims, 17 Drawing Figures

SOLAR ENERGY CONCENTRATION SYSTEM

This invention relates in general to solar energy and, in particular, to a solar radiated energy concentration system for concentrating energy input to a highly efficient radiant energy to electric power transducer in the ratio range of from 20,000 to 1 up to 250,000 to 1 dependent upon the ratio required for optimized efficiency in operation of the transducer. The solar energy concentration system concentrates solar radiation on an energy conversion device such as a solar radiant energy to electric power thermionic conversion transducer that is the subject of Raymond D. Brunson's U.S. Patent Application Ser. No. 721,800 filed Sept. 8, 1976, entitled "Radiant Energy to Electrical Power Conversion System".

The recent energy crisis and fuel shortages have resulted in a considerable amount of attention being focused on energy, its availability and use. The primary reason for this is because it is finally being realized that energy utlimately determines the very life style of each individual, with energy being a primary element determining financial systems, governments, and nations.

The two basic reasons for the increased attention on energy are supply and risk. Supply in the realization that the source now being used most extensively is not inexhaustible. In fact, some nations are completely without oil except for imports; others import more than they produce; and finally, since the petroleum production cycle is not self regenerative, at some time in the future, all oil could be totally consumed. The other reason for increased attention, risk, is brought about by the realization of the threat to the environment and, in some cases, the possibility of catastrophic explosions by some energy forms. The residue from the combustion of coal and gasoline pollute the air and thermal and other wastes from nuclear energy pollute water in streams and rivers.

For the above concerns and reasons, it would be highly desirable to find another source of energy and the means to transduce, control, and to use it to replace and augment the energy supplies now in use. Such an energy source should not only alleviate the concerns expressed above, but also compete successfully with the advantages derived from the energy sources presently in use such as low cost, reliability, convenience, versatility, and efficiency.

Solar energy is much more available than any other form of energy. The radiation from the sun falls on every square foot of the earth's surface. The radiation intensity may vary with the declination angle of the sun, latitude, cloud cover, time of day, etc. However, these parameters only vary the amount of energy. The total supply is inexhaustable, or if not, there will be no need for energy. Further, there are no by-products of the solar process to pollute the atmosphere, and the process is not dangerously critical, such as to present explosion and/or radiation catastrophe problems.

Any product using electricity as an energy input is a suitable candidate for a solar energy to electrical energy conversion process and with highly efficient solar energy processing many products previously not designed for electric power may be changed to use electricity.

An efficient solar energy process can prove to be much more convenient than other energy sources in many areas. For example, if a building is heated by the solar process, it would not require delivery and storage, and there would be no running out of fuel as there would be with coal and fuel oil. A power company would require distribution lines to each location with the exact site located, whereas, the solar process would be completely versatile to any location, with some solar energy process systems completely self-sustaining. Efficiency of systems has been a major parameter that has been used primarily in connection with size and temperature constraints. This is still the case and the new solar process compares quite favorably with other processes and it is especially true if the refining plant and storage areas for gasoline and the generating plants and transmission lines for electricity are taken into account.

The cost of the basic supply for solar energy is free. The maintenance cost for the transducer is very low and life is extremely long, making the life cycle cost of the product very low. This makes the cost of this process much less than petroleum where there is cost involved in geophysical exploration to find oil, cost of buying the oil from the owner; cost of drilling and pumping the oil; cost of transporting, storing and refining the oil; and the cost of distribution of the refined product. A similar analysis could be made for generating electricity by a power company. All of the above costs for petroleum would only add up to the fuel cost at the input to the power generation station. To this cost would have to be added the cost of the generating plant, transmission and distribution. Since the solar energy is available at the location of use, it is easily seen that solar energy is inherently cheaper than petroleum or commercial electricity. However, it is important that solar energy be concentrated at the input to the transducer to a level exceeding 2,800 degrees Kelvin and that this be maintained as much as possible through the daylight hours. This may be accomplished with a solar radiant energy concentrator system that collects solar radiation falling onto several reflection areas that are positioned to reflect radiation onto a concentrator that then concentrate focuses the radiation onto the much smaller target area input to the solar transducer. Collecting solar radiation and concentrating this energy on a smaller area can be easily accomplished for a given static condition such as by holding a magnifying glass over a piece of paper on a bright sunlight day. Unfortunately, this type approach cannot provide the continuous input of energy required to effectively operate a solar transducer or any other solar energy conversion device. A solar energy concentration system must have the capability of collecting the available solar radiation on a continuous basis and concentrating this energy on a focal area of the transducer at a rate which maximizes the efficiency of the thermionic transducer. Further, the solar electric system referenced above requires that a very high level of solar radiation be concentrated onto a small area on the emitter element of the thermionic transducer, in order to heat that element to high level temperatures required to efficiently generate electricity using the thermionic process. The thermionic process as employed in this solar electric system requires that the target area on the transducer emitter must be heated to temperatures greater than 2800 degrees Kelvin with the actual size of the target area on any given emitter dependent on several variables. These variables include the power output requirements, the design operating temperature of the emitter, and the design operational efficiency of the transducer. The combination of the size of the target area and the temperature of the target area determine the power output of the thermionic transducer device.

In order to maximize the efficiency of the solar radiated energy concentrator system, it must have the capability of collecting the available solar radiation on a continuous basis throughout the sunlight hours of each day even through some clouding periods of time. In compensating for clouding and other solar radiation moderating states the reflection area reflecting radiation being delivered to the transducer may be varied.

Since the relationship between the position of the sun and any given point on the surface of the earth is constantly changing, due to the angle of declination of the axis of the earth, the geographical location of the given point and the daily rotation of the earth on its axis, a solar antenna system must have the capability of tracking the relative movement of the sun to maximize the collection of solar radiation. It is important that the solar antenna system have the capability of tracking the relative position of the sun and exposing a variable area of collection to the solar radiation source and reflecting radiation onto a concentrator device that concentrates and focuses the solar radiation onto a target area as required by the thermionic transducer device or other solar devices.

It is, therefore, a principal object of this invention to provide a solar energy concentration system feeding a controlled level of concentrated solar energy to a thermionic transducer target area.

Another object with such a solar energy concentration system is to provide for collecting solar radiation from large areas and reflecting this energy onto a concentrator in turn focusing the gathered reflected radiation onto a smaller target area with a minimum loss in collected energy.

A further object is to achieve sufficiently high thermionic transducer target area temperature levels for highly efficient radiant energy to electrical power conversion.

Another object is to provide a solar concentration system capable of collecting available solar radiation on a continuous basis throughout the sunlight hours of each day.

A further object with such a solar radiation concentration system is to compensate for clouding and other solar radiation moderating states.

Features of the invention useful in accomplishing the above objects include, in a solar energy concentration system, a multi-surfaced reflective concentrator receiving reflected solar radiation from a plurality of reflector units and concentration focusing of reflected radiation by the concentrator to a focal target area at the input of a thermionic conversion transducer. The target area on a transducer is generally the combination of a plurality of focal areas. The concentrator is generally circular in shape made up of a series of circular bands concaved inward and with each band set at an angle relative to a flat-face reference surface of the concentrator that will reflect and concentrate the solar rays' input to the surface between the inner and outer edges of each circular band to a prescribed focal area. The concentrator and the transducer are stationary and in fixed prescribed position and spacing relative to each other with the concentrator situated such that a number of reflectors can be selectively appropriately aligned at all daylight times to reflect optimal quantities of solar energy to the concentrator. In order to maintain this relationship between the reflectors and the concentrator and proper energy focus to the transducer several varying relationships are provided for along with a one-time declination adjustment for placement of the system in different geographical locations. In addition to the one-time declination-latitude position setting a declination adjustor shifts position of reflector units to compensate for the constantly varying declination angle of the earth toward the sun. This declination angle varies on a yearly basis as the seasons change from the vernal equinox on about March 21st to autumnal equinox on about September 23rd, a movement from North to South of 47 degrees and return in rotation of the axis of the earth that occurs once every sidereal year. A daily rotation adjustor is also included that compensates for the daily rotation of the earth from West to East on its axis for as much as a full 360 degrees if required. An additional control capability provides for diverting more or less reflector units from reflection to the concentrator as an energy concentration control to vary in the ratio range of from 20,000 to 1 up to as much as approximately 250,000 to 1.

Specific embodiments representing what are presently regarded as the best mode of carrying out the invention are illustrated in the accompanying drawings.

Figure 1:
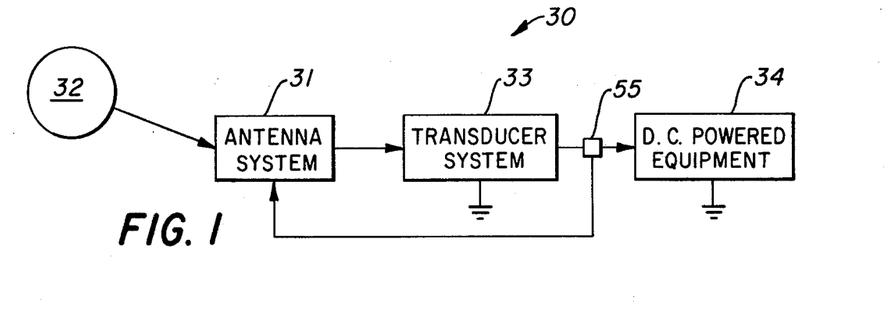
FIG. 1 represents a block schematic showing of solar energy concentrating system.
Figure 2:
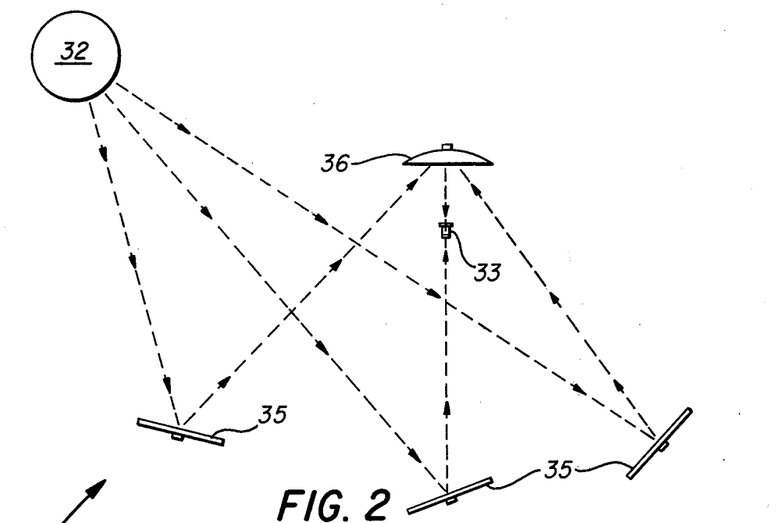
FIG. 2, a simplified sketch of the solar energy concentrating system of FIG. 1.
Figure 3:
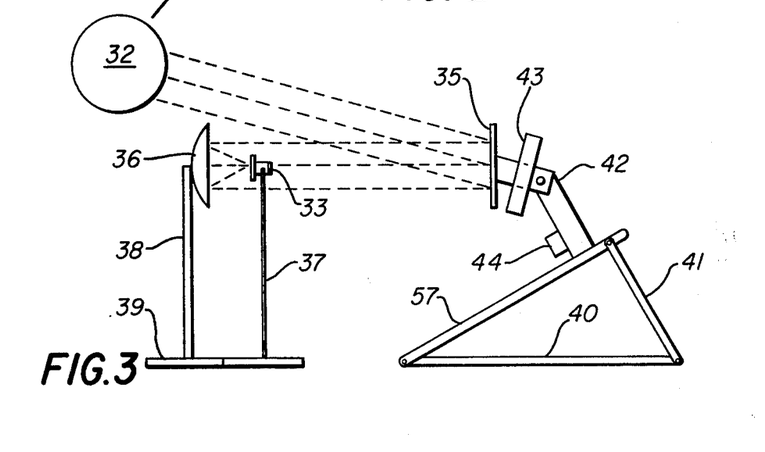
FIG. 3, a side elevation view of the solar energy concentrating system of FIGS. 1 and 2 showing the mounting and adjustment arrangements for one of the system reflectors.

Referring to the drawings:

The solar energy concentrating system 30 of FIG. 1 is shown to have an antenna system 31 receiving solar radiation from the sun 32 and delivering concentrated solar radiation to a radiant energy to electric power transducer 33 that delivers DC power output to DC powered equipment 34. Referring also to FIG. 2, a plurality of reflectors 35 as part of the antenna system 31 reflect solar radiation to concentrator 36 that concentrate focuses radiation therefrom to transducer 33. The transducer 33 and the concentrator 36 are shown in FIG. 3 to be mounted in fixed relation to each other by mount structures 37 and 38, respectively, from a common platform base 39. A reflector 35 is shown with mounting including a base 40 with a latitude adjustment structure 41 indicated along with declination adjustment structure 42, daily rotation structure 43, and a tracking clock 44.

Figure 4:
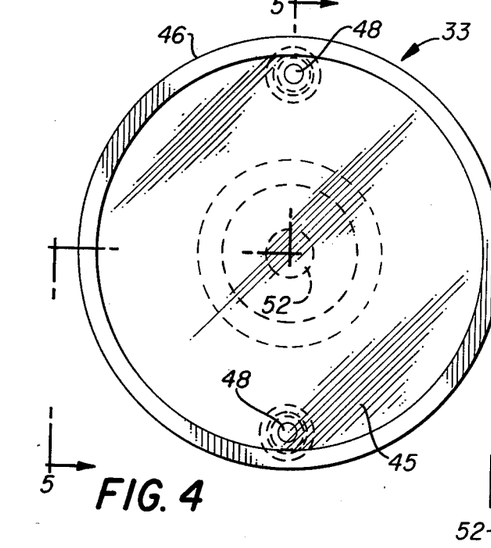
FIG. 4, a front energy input face view of a radiant energy to electrical power transducer.
Figure 5:
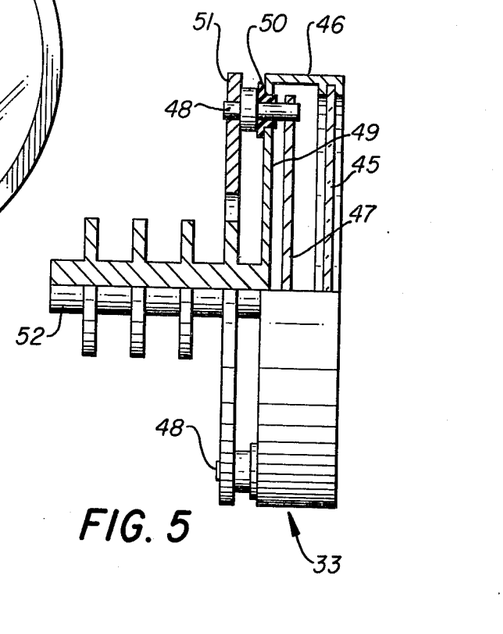
FIG. 5, a partially broken away and sectioned side elevation view taken along line 5—5 of the transducer in FIG. 4.

The solar radiant energy to electric power thermionic conversion transducer 33 is shown in FIGS. 4 and 5 to have a high temperature glass input face 45 that that forms a vacuum chamber with housing 46 within which emitter disc 47 is mounted by current feed through pins 48 in position to receive focused solar radiation from concentrator 36. The emitter disc 47 when heated sufficiently acts as a cathode in a thermionic action emitting electrons in an electron transfer flow to collector disc 49. Current feed through pins 48 extend through insulators 50 and mount a current ring 51, and the collector disc 49 is provided with a finned cooling extension 52. The current ring 51 and collector cooling extension 52 are connected as the opposite DC terminal connections (detail not shown) in an external power circuit.

Figure 6:
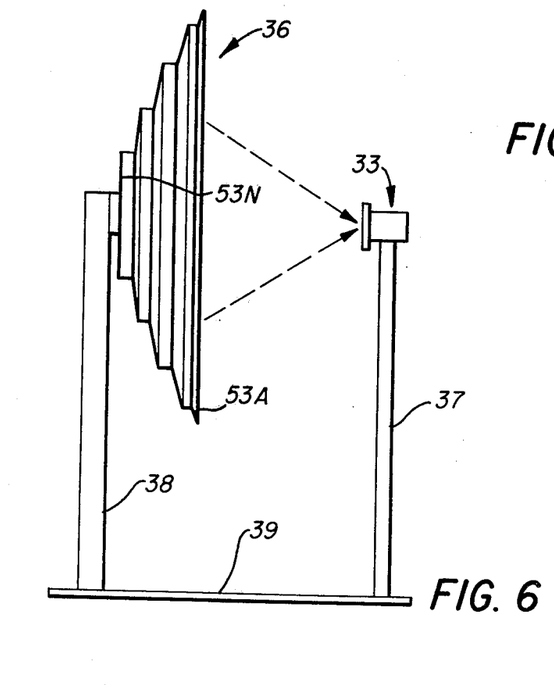
FIG. 6, an enlarged side elevation view of the concentrator and transducer on their fixed mountings.

In FIG. 6 the transducer 33 and the concentrator 36 are shown with their fixed mountings and the concentrator 36 in enlarged elevation section showing a series of annular step rings 53A ... 53N that have substantially uniform step width from outermost step 53A to innermost step 53N to approach having steps projecting substantially the same target focus area. Further, step rings 53A ... 53N have an inward concave slanted surface as an aid in focusing concentrator 36 reflected solar radiation to the transducer 33 input face with each step concave surface being highly reflective such as with mirrors, polished metal surfaces, epoxy resins with reflective surfaces thereon, or deposits of highly reflective materials on other metal surfaces. The concentrator 36 concentrates and focuses solar radiation reflected thereto from reflectors 35 onto the smaller target emitter element area input of transducer 33 with a minimum loss or reduction in the collected energy. With appropriate concave angling of step rings 53A ... 53N the target area on a given transducer cathode emitter 47 is actually the combination of one or more focal areas depending on the number of reflectors 35 position set to reflect solar radiation to the concentrator 36. This is with the focal areas encompassed within a given cathode emitter 47 target area representing the concentrated solar radiation input to the concentrator 36 for a given set of reflectors 35 oriented for reflection to the concentrator 36.

Figure 7:
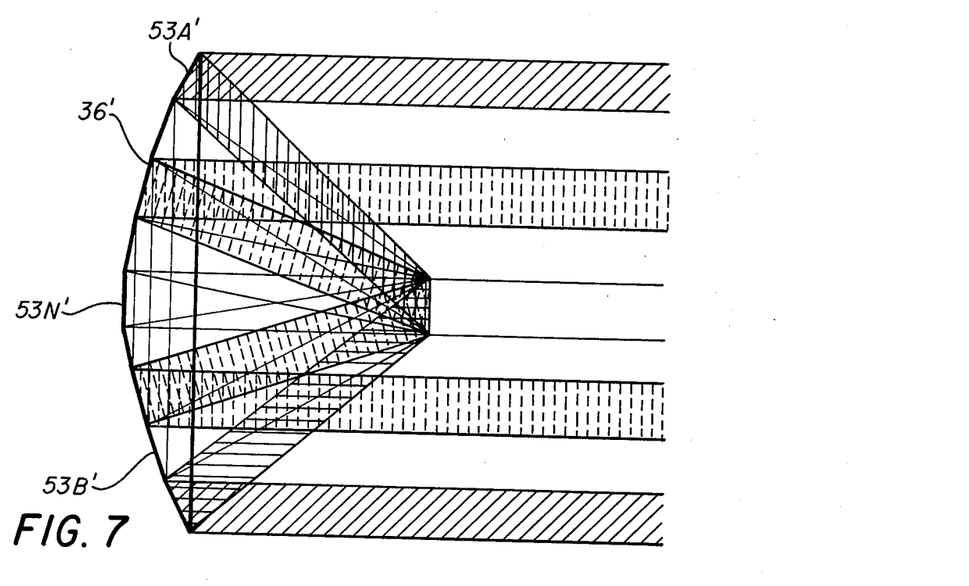
FIG. 7, a diagram of energy concentration of direct solar rays from circular bands of a concentrator.
Figure 8:
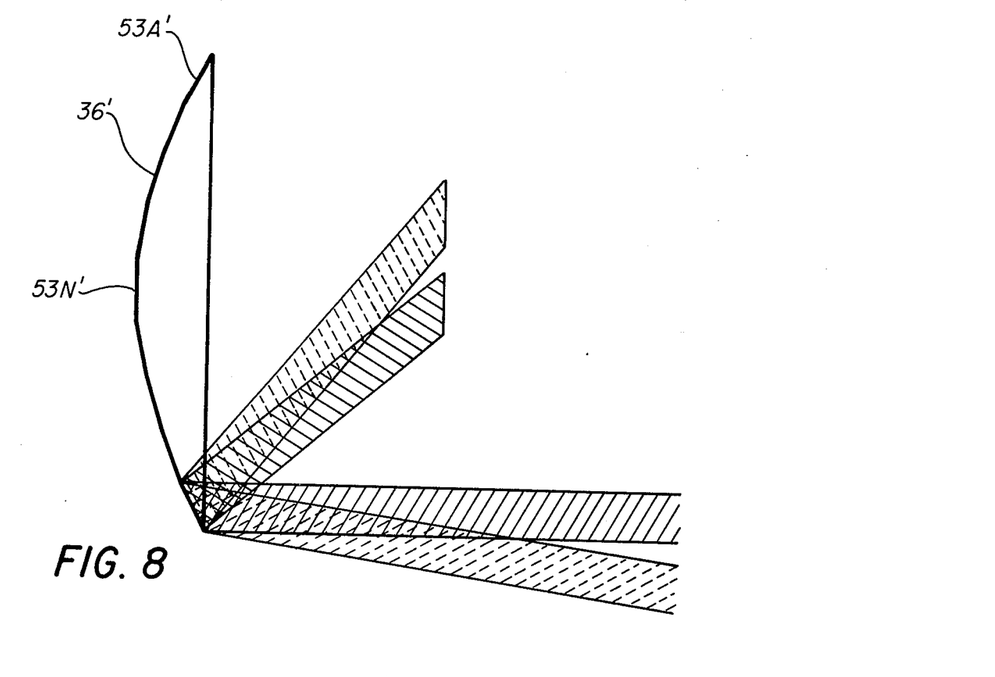
FIG. 8, a diagram of energy concentration of an angularly reflected input solar ray as compared to a direct input solar ray from one concentrator band.

While concentrator 36 is shown to be a circular band stepped concentrator in FIG. 6, an appropriate concentrator 36' could be constructed with the circular bands 53A' ... 53N' that are at different concave angles in a concave concentrator 36' structure such as shown in FIGS. 7 and 8. Energy concentration of reflected direct solar rays from circular bands of a concave concentrator 36' are illustrated in FIG. 7 and energy concentration of an angularly reflected input ray as compared to a direct reflected input ray from one concentrator 36' band is illustrated in FIG. 8. The series of circular bands of either concentrator configuration are designed to have an angle of reflection such that the innermost band edge and the outermost band edge of each respective band reflects and concentrates the input rays onto the edges of each respective prescribed focal area. With these concentrators substantially all solar ray input to a given circular band will be reflected and concentrated within the focal target area for that band. The cumulative effect is to concentrate all solar radiation reflected from multiple reflectors 35 to the concentrator down to a focal target area encompassed within the target area of the transducer cathode emitter 47 that is of enlarged lateral expanse to fully encompass the resultant concentrated focused inputs from all reflectors 35 of the system. The reflectors 35 must be adjustable such that the concentration of energy input to the transducer target area fall in a concentration ratio within the range of 20,000 to 1 to 250,000 to 1.

Varying the amount of solar radiation reflected to the energy concentrator 36 (36') can be accomplished by changing one or both of the following reflector 35 to energy concentrator geometric relationships:
  (a) The physical distance between the reflector and the concentrator unit.
  (b) The degrees of angular offset from a line which is on a true perpendicular alignment with the center point of the concentrator and its flat-face surface, and a line drawn between the center point of the reflector 35 face and the center point of the concentrator 36 (36').

Figure 9:
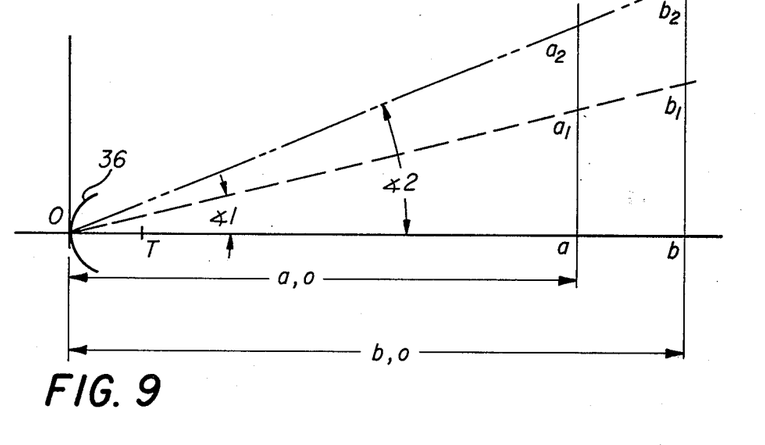
FIG. 9, a diagram of relative angular ray input relation to a concentrator.

With reference to the FIG. 9 diagram of relative angular ray inputs to a concentrator 36 (36'), consider the three following cases:
  Case 1—Increase distance between concentrator 36 and reflector 35 field. Thus $b_0 > a_0$ and $b_1 - b > a_1 - a$.
  Case 2—Increase offset angle of line drawn from focal point and line drawn perpendicular to focal point. Thus $\angle 2 > \angle 1$. $\therefore a_2 - a > a_1 - a$.
  Case 3—Increase both the distance and offset angle as described in Cases 1 and 2. $\therefore b_2 - b > a_1 - a$.

It should be noted that FIG. 9 and above represents a section of the field which is available for positioning the reflectors associated with a given concentrator. This is true because the angular projection from the energy concentrator is a cone-shaped area. Thus in Case 3 above, the area available for positioning the reflectors is $\pi R^2$ or $\pi(b_2-b)^2$. Through use of this solar radiation concentration concept it is possible to reflect the predetermined required level of radiation onto the energy concentrator by varying the distance between the concentrator and the reflectors and also offset angle as described above. This is true provided the design of the concentrator 36 is such that the reflector 35 and concentrated solar radiation can be focused in such a manner that the required focal area is within the required target area of the transducer cathode emitter 47 that is enlarged to present an adequate focal target area. Further, by using this solar radiation concentration concept, it is possible to multiply the concentration ratio of the energy concentration unit by the number of reflecting units which can be appropriately positioned to reflect solar radiation.

The target area of a specific transducer 33 is made up of several closely positioned focal areas which represent the concentrated energy reflected from one or more than one antenna reflectors 35. It is important to note that since the angles of reflection off of a given surface is equal to the angle of the incidents, the focal point of the solar radiation reflected from a reflector positioned at point $b_2$, as shown in FIG. 9, would be offset from the focal point of the concentrated solar radiation reflected from a reflector 35 positioned at point b. The offset distance that would result from this angular offset would be equal to the focal distance from the concentrator 36 to the transducer cathode emitter 47 multiplied by the tangent of angle 2.

Consequently, an interrelationship exists between the design constraints on the maximum acceptable target area on the transducer, the maximum permissible angle for the angle $b,o,b_2$, and the focal distance between the concentrator and the transducer. Since it is advantageous in designing the solar electric system to concentrate as much solar radiation as possible to a specific focal area the concentrator unit is designed such that the size of the focal area controls the width of each band or circular sector of the concentrator and the focal distance for that concentrator. The number of circular bands, or equivalent flat-face surface area required for each concentrator 36 is dependent upon the level of solar radiation required by the specific solar electric system design which subsequently controls the size and number of reflectors associated with each concentrator 36. However, it should be noted that all the solar radiation reflected onto the concentrator 36 unit from a given reflector 35 unit (less the absorption losses for that unit) is concentrated onto the transducer cathode emitter 47.

The reflectors 35 are designed to perform the function of collecting and reflecting the solar radiation onto the concentrator 36. In order to maximize the reflectivity of the reflectors 35, the sunward surface of the reflectors 35 will be highly reflective such as with mirrors, polished metals, epoxy resins, or deposits of highly reflective materials on other metal surfaces. The concept of the reflectors 35 is that one or more reflectors 36 can focus radiation to the energy concentrator 36 that in turn focuses radiated energy onto the transducer 33 which absorbs the heat energy and converts it to electrical output. A circular shaped flat or slightly curved surface plate as each reflector 35 is used to reflect the direct solar radiation onto a concentrator 36. The reflectors 35 are smaller or larger in size or surface area than the concentrator 36 and reflect the direct radiation onto the concentrator in such a way as to allow the concentrator to be set in a fixed position and concentrate a maximum of the reflected radiation. In order to accomplish this redirection of the solar radiation onto the stationary concentrator device, it is necessary for the reflectors 35 to track the westward movement of the sun in such a way as to maintain the required angle of incidence between the surface of the reflectors 35 and the sun, and the resulting angle of reflection from respective reflectors 35 to the concentrator 36. To reflect the maximum amount of radiation onto the concentrator 36 the reflectors 35 are adjusted continuously during the day to maintain the required angle of incidence. This continuous adjustment of the reflectors 35 to track the westward movement of the sun is performed by the FIG. 13 daily rotation adjustor 54 which receives pulses at given increments from the tracking clock 44. The tracking clock 44 is a solid state digital clock which is designed to provide inputs to the daily rotation adjustor 54 for incremental movements and daily resetting of the reflectors 35 to the start position.

The reflectors 35 also provide a means of intensity control of the solar radiation reflected onto the concentrator 36. The concept of solar radiation reflected onto the concentrator 36 can be increased or decreased by resetting the reflectors 35 to change the angle of incidence between the sun and the surface of the reflectors 35, for example, if it is necessary to decrease the amount of solar radiation being reflected onto the concentrator 36 during the midday period, then one or more of the reflectors 35 can be shifted to the daily restart position to misalign the angle of incidence such that the solar radiation would not be reflected toward the concentrator 36. Another example of resetting reflectors 35 is to increase the solar radiation reflected onto the concentrator 36 during the late afternoon period by resetting one or more reflectors 35 from the restart position to the appropriate position for that given time of day to provide the required angle of incidence to redirect the solar radiation onto the concentrator 36. The tracking clock provides the correct position and pulses to the daily rotation device 54 to reset reflectors 35 to the appropriate positions.

An intensity control device 55 indicated in FIG. 1 is used to determine the need to increase or decrease the solar radiation collected by the concentrator device. The intensity control device 55 measures the electrical current flow output of the transducer 33 as a measure of the temperature of the cathode emitter 47 in the transducer 33 to determine the need to increase or decrease the amount of solar radiation to be reflected to the concentrator 36 in order to maintain the desired level of output from the transducer 33 while controlling the cathode emitter 47 temperature and preventing excessive overheating of the cathode emitter 47.

Figure 10:
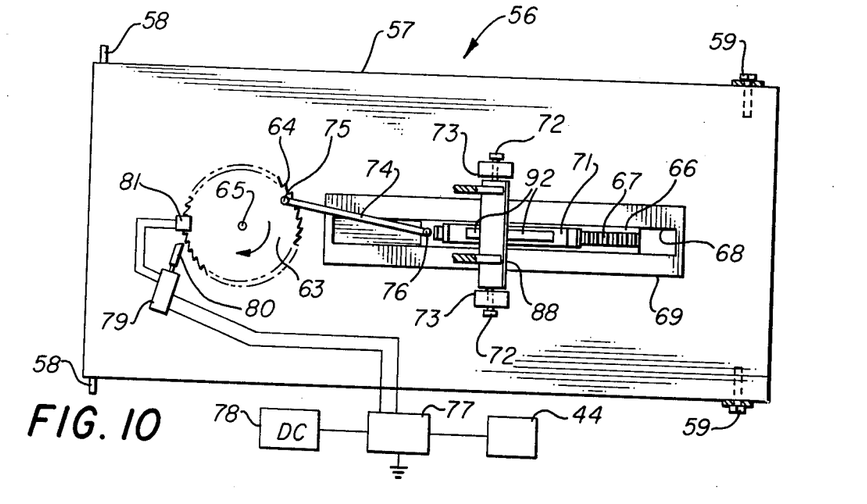
FIG. 10, a top plan view of the declination adjustor for a reflector.
Figure 11:
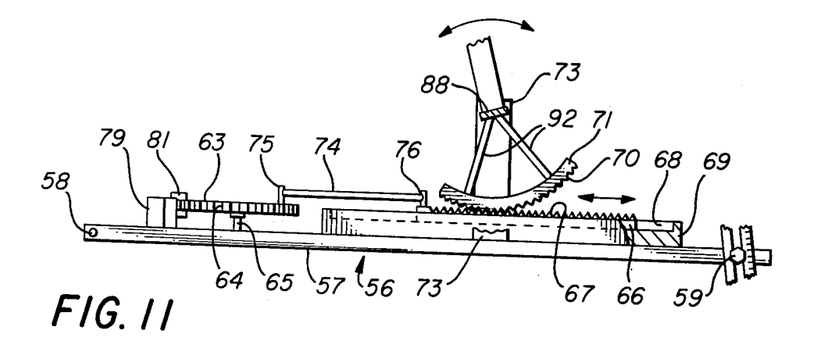
FIG. 11, a side elevation view of the declination adjustor of FIG. 10.
Figure 12:
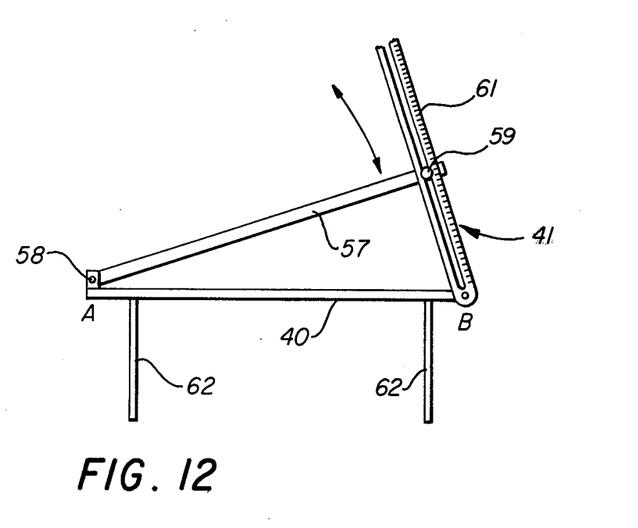
FIG. 12, a side elevation view of latitude setting structure.

A declination device 56, as shown in FIGS. 10 and 11, is mounted on declination adjustor platform 57 that, as shown in FIG. 12, is provided with a latitude adjustment structure 41. This is provided in the mountings of reflectors 35 to accommodate the geographical location of the system at any latitude either North or South of the equator with the declination adjustor platform 57 set at an inclination angle compensating for the latitude of the system location. This is accomplished with the platform 57 pivoted up about the pivot pin 58 interconnection with base platform 40 and adjustment bolts 59 locking the platform 57 at the proper inclination angle for the particular site latitude location. Two inclination support braces 60, as part of latitude adjustment structure 41, are pivotally interconnected by pivot pin 59 interconnections with opposite sides of base platform 40 to articulate with inclination raising of the platform 57. One or both inclination support braces 60 are provided with degree latitude setting marks 61 (0 degrees through as much as 90 degrees), with 90 degrees being the setting required for a polar site location. As a practical matter most site locations would be accommodated by braces 60 of a length and marking to 50 degrees latitude.

The degree latitude markings are inscribed at an appropriate distance from than 0° (zero) degrees point based on the following:

Latitude Degree Marking = Sine of Latitude Degrees times the length of the Declination Adjustor Platform or a distance between the pivot point and adjustment bolt on the Base Platform.

The base platform 40 is set level before the latitude adjustment is made. At the equator the reflectors 35 are set up in a level position with the platform 57 with declination adjustor also set level at the zero degrees position. At 30° (thirty degrees) North latitude, the platform 40 will be set level with the base pivot pins 58 at the South end and the adjustment bolts 59 at the North end. The platforms 40 and 57 will be reversed at 30° South latitude location. However, the platform will always be aligned in a true South-North direction of A to B for locations in the Northern Hemisphere and B to A for location in the Southern Hemisphere.

It should be noted that the base platform 40 may include height adjustment legs 62 to assure that the reflectors 35 do not come into interferring contact with anything due to low clearance.

Referring again to FIGS. 10 and 11, the declination adjustment device 56 mounted on declination adjustor platform 57 is designed to provide the capability of North-South-North rotation movement of 47° in correspondence to the daily relationship of the earth to sun to maintain the reflectors 35 at an angle of incident to the sun that maximizes reflected solar radiation onto the concentrator 36, thus eliminating the offset caused by the declination angle of the earth's axis.

Figure 13:
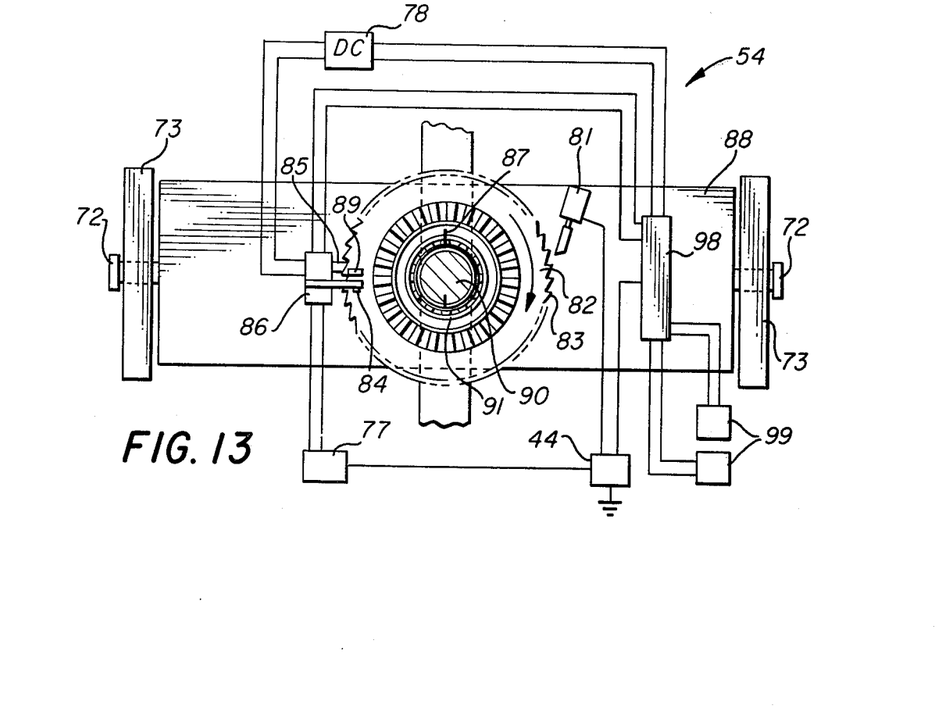
FIG. 13, a partial broken away top plan view of a reflector daily rotation adjustor.
Figure 14:
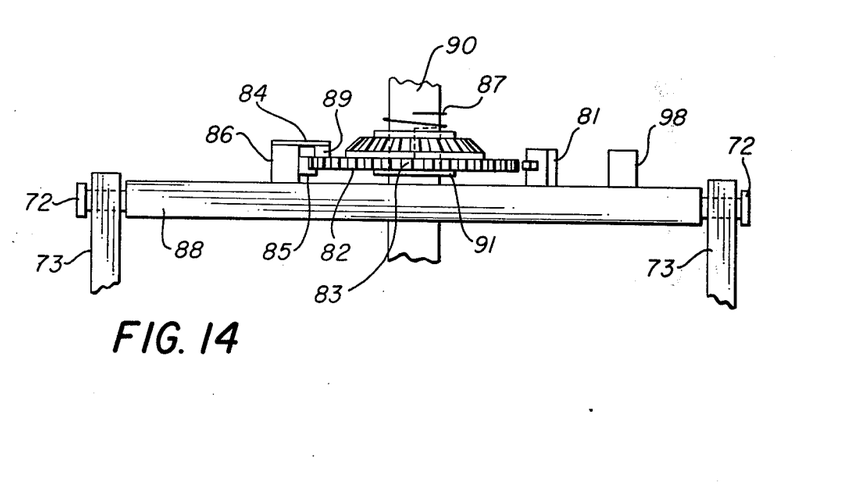
FIG. 14, a partial front elevation view of the reflector daily rotation adjustor of FIG. 13.

The declination angle of the reflector device will be changed on a daily basis by a digital tracking clock 44 which will trigger the resetting of the daily rotation adjustor device 54 of FIGS. 13 and 14 to its start point. After resetting the daily rotation adjustor device 54 the declination adjustor device 56 will be incremented one gear tooth position of rotation wheel gear 63, provided the tracking clock 44 has calculated that daylight hours have ended. Rotation wheel gear 63 that is equipped with 365 teeth 64, one for each day of the year is mounted for rotation on gear hub pin 65 that is mounted on platform 57. A rack bar 66 having rack teeth 67 is slidably guided for longitudinal movement in slide channel 68 of channel guide member 69 that is fixed to platform 57. Rack teeth 67 of rack bar 66 mesh with gear teeth 70 of gear arc member 71 pivot mounted to declination pivot the daily rotation adjustor 54 about pivot pins 72 that is mounted in and extends between reflector supports 73. A connecting rod 74 interconnects pivot interconnection structure 75 eccentrically positioned on the rotation wheel gear 63 and a pivot pin 76 connection with an end of rack box 66. Tracking clock 44 is connected for providing an input to daily rotation adjustor reset switch 77 having a connection with dc power supply 78 and that is connected to solenoid 79 actuated gear tooth stepper 80. A gear position lock device 81 is also connected to solenoid 79 for gear wheel 63 release as the solenoid 79 and gear tooth stepper 80 are actuated for wheel 63 tooth 64 stepped rotation advance and then gear wheel 63 position lock between tooth 64 step advance steps.

With gear wheel 63 rotation is incremented one tooth position advance on a daily basis by the tracking clock 44 since wheel 63 has 365 gear teeth 64. The center of guide channel 68 contained rack bar 66 to pivot center spacing on the gear wheel 63 is equal to the circumference of the wheel connecting rod 74 connection inscribed circle divided by the desired spacing. Since, the sidereal year is equal to 365 days, 6 hours, 9 minutes, 9.5 seconds of a mean solar year, it is necessary to adjust the spacing to account for the difference. This difference is normally accounted for in the calendar year by having an additional day in the year on every fourth year or leap year.

To properly track the declination of the sun on a daily basis it will be necessary to compensate for the difference on a daily basis. Therefore, the wheel center to rack bar 66 center space is equal to the following as shown on the next page.

Sidereal converted to solar mean time in

| | | |
|---|---|---|
| 365 days | = | 365.00000 |
| 6 hours = 6/24 | = | 0.25000 |
| 9 minutes = 9/1440 min/day | = | 0.00625 |
| 10 seconds = 10/86400 sec/day | = | 0.00012 |
| | | 365.25637 |

Slot Center to Center Spacing = $2\pi r / \frac{365.25637}{365.0}$

The rotation wheel drives the connecting rod which pushes the declination angle gear. The movement of the declination angle gear will be similar to a sine wave plot since the pivot point of the connecting rod on the rotation wheel is located near the periphery of the wheel offset from the radius or axis point.

The rotation wheel is marked and numbered at every fifth gear slot, i.e., (5, 10, 20, ... 365) so the declination angle can be set for the initial start up date. The starting date may be translated on a chart which will convert the actual date of a given year to the sidereal time date.

To collect solar energy in an efficient manner, it is necessary for the reflectors 35 to track the daily East to West movement of the sun. The function of the daily rotation adjustor 54 is to perform this tracking in a manner that exposes the largest portion of the reflection area of reflectors 35 to the direct rays of the sun. In order to accomplish this function, it is necessary to set the reflectors 35 in a start position or the East-most position which can be adjusted to accommodate the extremes of daily rotation required which is dependent on the latitude of the antenna location, i.e., at the equator the maximum daily rotation is 180° while at the North or South Pole the maximum daily rotation is 360°.

At the start of daylight and throughout the daylight hours, and with reference to FIGS. 13 through 17, the tracking clock 44 performs calculations to determine the timely generation of incrementing signals. The incrementing signals are transmitted from the tracking clock 44 to the solenoid activator device 81 to increment the rotation gear wheel 82 one gear tooth 83 increment which is equivalent to one-half (½) degree of rotation or less (if required). The action is repeated to track the sun's westward movement until sundown as calculated by the tracking clock 44 and then the reset switch 84 is triggered which releases the gear position lock and reset device 85 which releases the gear position lock solenoid 86 and permits a coil spring device 87 to return the antenna reflector 35 of the mount structure to the start position state shown for the daily rotation adjustor 54 shown in FIG. 13.

The daily rotation adjustor 54 and auxiliary devices for each reflector 35 are mounted on the top of the declination swivel platform 88 that is connected to the reflector 35 antenna supports 73 and platform 57 by pivot pins 72. The rotation gear wheel 82 has sufficient gear teeth 83 to allow the incremented movement of the wheel 82 one-half (½) degree of rotation each time the solenoid 81 is activated. This one-half degree of rotation of a reflector 35 minimizes the drift distance of the redirected solar radiation and maintains a reasonable level of focusing on the concentrator 36. When the tracking clock 44 activates the rotation solenoid 81, it in turn activates the gear position lock device 85 to move to a release position. After the rotation solenoid 81 movement, the gear position lock device 85 is moved back to the lock position, thus completing one incremental rotation gear wheel 82 movement.

Figure 15:
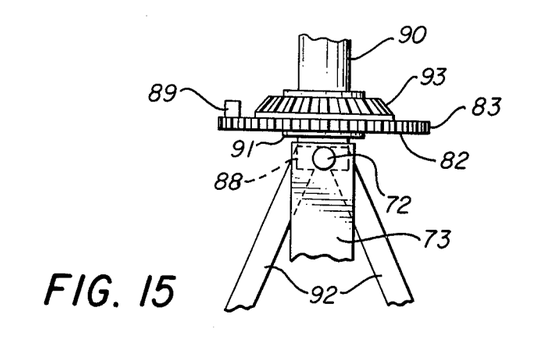
FIG. 15, a partial side elevation view of the reflector daily rotation adjustor of FIGS. 13 and 14.
Figure 16:
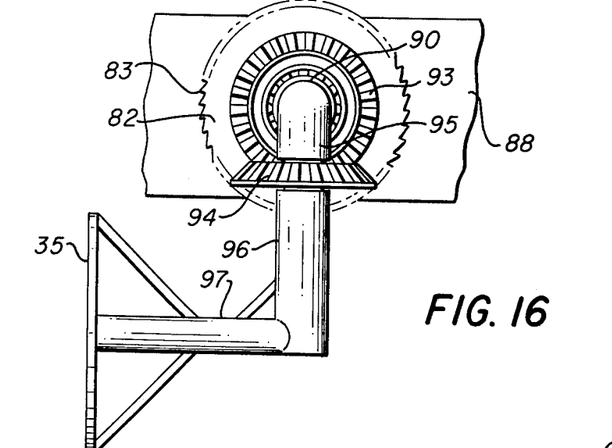
FIG. 16, a partial top plan view of a reflector mounting above the daily rotation adjustor of FIG. 13; and, FIG. 17, a partial front elevation view of the reflector and reflector mounting of FIG. 16.
Figure 17:
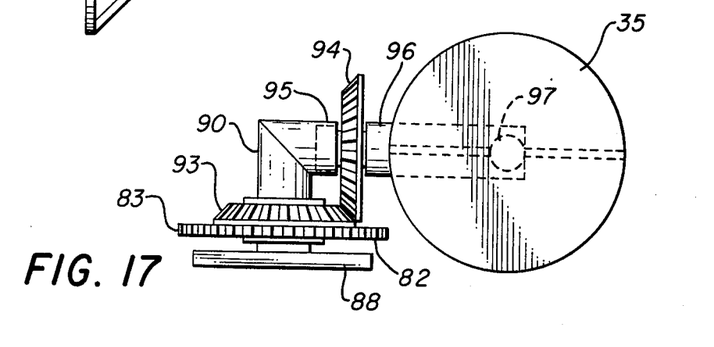

When the daylight hours have ended as calculated by the tracking clock 44, it activates the gear position lock device 85 to a release position and allows the coil spring device 87 to return the reflector 35 to the start position. The gear position lock device 85 is then reset to a lock state. The reset switch 84 is affixed to the gear position lock device 85 that is mounted in stationary relation to the rotation gear wheel 82. A reset position stopper 89 is mounted on the rotation gear wheel 82. If the reset switch 84 is activated by the reset position stopper 89 due to extreme rotation movement, i.e., 359° of rotation, then the gear position lock device 85 is released and this allows the coil spring device 87 to return the reflector 35 to the start position as described above. Obviously the coil spring device 87 includes connections at opposite ends to, respectively, rotation gear wheel 82 and reflector 35 support post 90. The reflector support past 90, as shown in FIG. 15, is affixed to the declination swivel platform 88 and is equipped with a bearing sleeve 91 for the rotation gear wheel 82. The reflector support post 90 and declination platform 88 support the rotation gear wheel 82 for relative rotation thereon. The declination platform 88, with the rotation gear wheel 82 and the reflector 35 mounting support post 90 thereon are shifted in declination adjustment about pivot pins 72 through a 47 degree arcuate range of declination adjustment range with the platform 88 connected through structural braces 92 to gear arc member 71. The reflector 35 support post 90 is fixed to and nonrotatively mounted on the declination platform 88 and the rotation gear wheel 82 is equipped with a bevel gear ring 93 that meshes with and drives bevel gear 94 to move reflector 35 through a sun tracking range movement through the daylight hours each day. The support post 90 projects upward perpendicularly to the declination swivel platform 88 to an upper end right angle transverse extension stub 95 normal to a plane substantially common to the declination swivel platform 88 pivot pins 72 axis and post 90. Reflector 35 mounting shaft 96 is rotatably mounted in support post 90 extension stub 95 to extend horizontally transversely relative to the declination swivel platform 88 with a sleeve bearing (detail not shown) and with bevel gear 94 fixed on shaft 96 for rotation with the shaft. The shaft 96 extends from its mounting in post stub 95 to a right angle arm 97 mounting the respective reflector 35. The support post 90 extends upward to a sufficient height for adequate reflector 35 clearance. Further, the bevel gears on the wheel 82 and the shaft 96 are the same diameter for a one-to-one rotation rate with thereby, the reflector 35 being rotated as much as 360 degrees (if necessary for an area of the world having daylight twenty-four hours a day through part of the year) in an East to West movement synchronized with movement of the sun by tracking clock 44 command signals. This is with rotation of reflector 35 up and around the axis of the reflector mounting shaft 96 in an East to West rotation as the shaft is driven through bevel gears 93 and 94.

The tracking clock 44 in driving control to the driving solenoid 81 may have a driving impulse time computed variance control for adjusting the rate of reflector 35 positioning drive for proper reflection to the concentrator 36 at all daylight times of the day. Furthermore, a light intensity calculator 98 having a light intensity indicating input from light intensity sensors 99 may be used providing a start signal to the tracking clock 44 when first each day there is sufficient light radiation from the sun to use the system. The tracking clock 44 with its included control and computer circuitry (detail not shown) then sends a fast series of impulses to the solenoid 81 to quickly step drive the rotation gear wheel 82 to the proper reflector position for that time of day with the wheel 82 thereafter driven properly by tracking clock 44 computer system determined timing pulses. Appropriate properly timed control pulses are also transmitted from the tracking clock 44 computer system to the daily rotation adjustor reset switch 77 for control of the wheel 82 lock and unlock for wheel stepped advance and lock steps.

It should be noted that the reflectors 35 may either be flat reflectors of appropriate size for reflecting directly to the concentrator 36 or larger reflectors that are of concave shape such as to provide solar radiation impingeing on the reflectors 35 be substantially entirely directed back with some focusing to the concentrator 36.

It should also be noted that post 90 could be equipped with an oppositely directed stub for the mounting of a second reflector on the same reflector mount system and a through drive shaft connection provided from the shaft 96, or alternately, a reverse in a double drive from the bevel ring gear 93.

Thus, whereas this invention is herein illustrated and described with respect to a particular embodiment thereof, it should be realized that various changes may be made without departing from essential contributions to the art made by the teachings hereof.

I claim:

1. In a solar radiant energy concentration system: a reflective concentrator; a thermionic energy conversion transducer; said concentrator and said transducer being mounted in fixed relation to each other; reflector means positioned for reflecting solar radiation to said concentrator and focusing of solar radiation from said concentrator to said transducer; position setting means; tracking means for reflector means tracking of the sun during daylight hours of the day; wherein said reflector means is a plurality of reflectors each positioned for reflecting solar radiation to said concentrator; and at least one reflector of said plurality of reflectors mounted on each of a plurality of declination adjustor support platforms; said position setting means includes a one-time declination-latitude position setting structure for each of said declination adjustor support platforms; each said position setting structure includes declination adjustor support means set at an inclination angle compensating for the latitude of the system location; said concentrator and said transducer are mounted in substantially North-South orientation with said concentrator generally closer to the equator than said transducer; said declination adjustor support means is in the form of a platform with pivotal interconnect means at one end with mounting means and having inclination angle setting means supporting said platform at a declination angle with declination angle setting lock means; with positioning of said declination adjustor means in substantially a North-South orientation at site location with said platform interconnect means at the end of said platform being located toward the equator; a declination adjustment device is mounted on each of said declination adjustor support platforms; said declination adjustment device is constructed with the declination adjustment range of 47 degrees movement corresponding to the yearly relationship of the earth to sun North-South-North rotation movement of 47 degrees to eliminate the offset caused by the declination angle of the earth's axis; and wherein said declination adjustment device includes a pivotally mounted declination swivel platform; an arc segment gear fixed to said declination swivel platform; a gear rack bar in drive engagement with said arc segment gear and mounted for slidable longitudinal back and forth guided movement on each said declination adjustor support platform; a drive wheel interconnected by connecting rod means with said gear rack bar for drive of said gear rack bar in a sine wave type plot; and step drive means for said drive wheel.

2. The solar radiant energy concentration system of claim 1, wherein said reflective concentrator is generally circular in shape made up of a plurality of circular bands.

3. The solar radiant energy concentration system of claim 2, wherein said plurality of circular bands are concaved inward with any one transverse section of each band at any annular location thereon set at an angle relative to a flat-face reference surface of said reflective concentrator.

4. The solar radiant energy concentration system of claim 1, wherein said transducer is a thermionic conversion transducer having relatively closely spaced cathode emitter disc and anode collector disc; with said anode collector disc having a rearwardly extending cooling extension body; and with the transverse area of said cathode emitter disc and the anode collector disc substantially enlarged relative to the transverse dimension of said cooling extension body to present adequate focal target area at the transducer cathode emitter disc input target surface.

5. The solar radiant energy concentration system of claim 4, wherein space between said cathode emitter disc and said anode collector disc is less than approximately 0.04 of an inch.

6. The solar radiant energy concentration system of claim 1, wherein each reflector is a flat plate reflector.

7. The solar radiant energy concentration system of claim 1, wherein some of the reflectors of said plurality of reflectors are slightly curved concave reflectors providing some focusing of reflected solar radiation to said concentrator.

8. The solar radiant energy concentration system of claim 7, wherein said concave reflectors are larger in lateral expanse than said concentrator.

9. The solar radiant energy concentration system of claim 1, wherein said drive wheel is a circumferentially toothed wheel with 365 teeth, one for each day of the year, driven by once a day activated step drive means; and computer digital clock drive signal source means for activating said once a day activated step drive means.

10. The solar radiant energy concentration system of claim 9, wherein said once a day activated step drive means is a solenoid drive device drive engaging teeth of said drive wheel; and solenoid activated drive wheel position lock and unlock means.

11. The solar radiant energy concentration system of claim 1, wherein each said pivotally mounted declination swivel platform mounts daily rotation adjustor means for tracking daily movement of the sun with reflector means mounted thereon; and at least one reflector as said reflector means mounted on each said pivotally mounted declination swivel platform.

12. The solar radiant energy concentration system of claim 11, wherein mounting structure for reflector means on each said pivotally mounted declination swivel platform includes, a support post; and a reflector mounting shaft rotatably mounted in said support post to extend horizontally transversely relative to said declination swivel platform; and daily rotation drive means mounted on said declination swivel platform; gear means driven by said daily rotation drive means interconnected to drive said reflector mounting shaft in rotary motion tracking the sun.

13. The solar radiant energy concentration system of claim 12, wherein said daily rotation drive means includes a stepping solenoid drive engaging said gear means; and computer system digital pulse drive circuit means circuit connected to said stepping solenoid.

14. The solar radiant energy concentration system of claim 12, wherein lock and unlock means is provided position locking and unlocking said gear means driven by said daily rotation drive means; said gear means having daily start position indexing means; and reset means for returning said gear means back to the daily start index position.

15. The solar radiant energy concentration system of claim 14, wherein said reset means includes spring return means interconnecting said gear means and fixed means on said pivotally mounted declination swivel platform with said spring return means resiliently stressed to return said gear means and the reflector means positioned thereby back to the daily start index position when the daily rotation drive stepping solenoid is disengaged and when said lock and unlock means is in the unlocked state from said gear means.

16. The solar radiant energy concentration system of claim 15, wherein reset switch means mounted on said declination swivel platform is positioned for activation by said drive wheel in a daily driven limit position; projection means on said drive wheel for contacting said reset switch means in the daily driven limit position; and circuit connection of said reset switch means for time computer activation and deactivation of said daily rotation drive stepping solenoid and said lock and unlock means for reset return of said gear means and the reflector means positioned thereby back to the daily start index position.

17. The solar radiant energy concentration system of claim 14, wherein said gear means includes a first bevel gear mounted on and rotatable with said drive wheel; and a second bevel gear mounted on and rotatable with said reflector mounting shaft in driven engagement with said first bevel gear.

18. The solar radiant energy concentration system of claim 14, including focused radiant energy intensity control means connected for sensing temperature of transducer means components through current flow sensing; said focused radiant energy intensity control means also connected to computer time control means of the system for selective reset return of one or more of said gear means and reflector means set combinations.

* * * * *